March 17, 1953    F. SCHLEGEL    2,631,497
TELEPHOTO OBJECTIVE
Filed Feb. 21, 1952
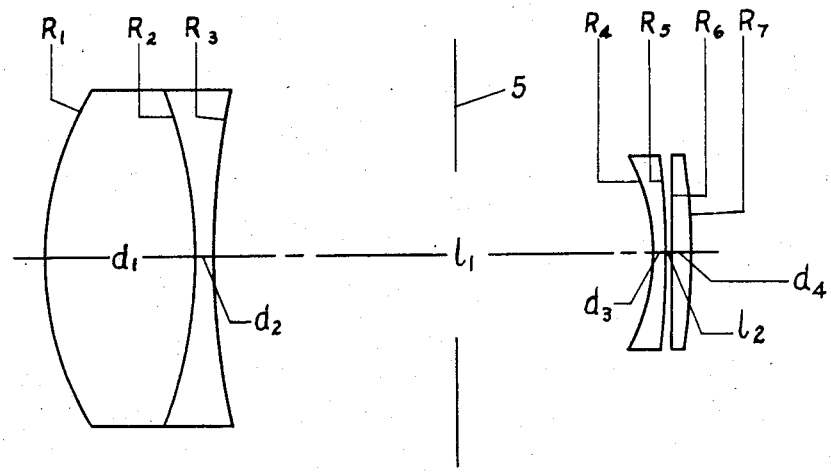
INVENTOR.
Franz Schlegel
BY
Zabel and Gritzbaugh
Attys.

Patented Mar. 17, 1953

2,631,497

UNITED STATES PATENT OFFICE 2,631,497

TELEPHOTO OBJECTIVE

Franz Schlegel, Munich, Germany, assignor to
Harry J. Graw, Chicago, Ill.

Application February 21, 1952, Serial No. 272,760

3 Claims. (Cl. 88—57)

My invention relates to a telephoto objective, and more particularly to a telephoto objective adapted to be used interchangeably with the conventional objective of a camera.

As is well known, a telephoto objective is so designed and constructed that the rear principal point is located in front (on the object side) of the objective, rather than within the length thereof as is true in conventional photographic objectives. This makes it possible to dispose the telephoto objective in reasonably close proximity to the image or film plane of the camera.

Telephoto objectives generally consist of front and rear lens groups, the front lens group being predominantly positive and the rear lens group being predominantly negative. The two groups are separated by an air space of substantial length.

In certain cameras on the market, the front wall of the camera case which contains the objective receptor has substantial thickness in terms of the diameter of the objective. Also, the camera shutter may be and generally is located in this camera wall at the rear of the receptor. The diameter of the opening in this wall to the rear of the objective receptor may be about the same as the diameter of the opening in the receptor. Thus the camera case wall at the rear of the objective frequently forms a virtual diaphragm opening to limit the cone of light passing from the objective to the film. This condition produces vignetting when previously known telephoto objectives are used with such cameras.

In addition to the vignetting difficulty, complications arising out of design requirements for obtaining full correction for the objective have imposed certain limitations on telephoto objectives. Thus, for example, most telephoto objectives designed with full correction for spherical and chromatic aberrations, coma, astigmatism, field curvature and distortion generally have had a relative aperture or speed of the order of about 1:6.3 and frequently slower.

One object of my invention is to provide a telephoto objective having full correction, and additionally having a relatively high speed, i. e. a speed up to about 1:4.5.

Another object of the invention is to provide a telephoto objective that readily can be interchanged with the conventional camera objective having a normal focal length. By way of example, the normal focal length of a conventional objective may be 50 mm. while the focal length of my telephoto objective may be twice that amount, or 100 mm.

Another object is to provide a telephoto objective having a reasonably short physical length.

Still another object is to provide a telephoto objective wherein vignetting does not occur despite the fact that the front wall of the camera casing may be so thick as to impose the previously mentioned limitations on the size of the opening therein.

Another object is to provide a telephoto objective wherein the distance from the rear vertex of the objective to the image or film plane of the camera (back focal length) is of the same order as that of the conventional objective supplied with the camera. As applied to an actual example, a 50 mm. focal length objective used in many small cameras generally has a back focal length of about 20 mm. This corresponds to a ratio of about 0.4 times the focal length of the objective. The new telephoto objective of my invention has a ratio of back focal length to focal length of substantially less than 0.4, and is more of the order of about 0.2.

In general, a highly corrected telephoto objective embodying my invention comprises four lens elements divided into two groups of two elements each. The front group is positive and the rear group is negative. The two groups are separated by an air space greater than 0.2 and less than 0.5 times the focal length of the objective.

The front positive lens group consists of a converging first lens element and a diverging second lens element cemented together to form a positive doublet. The radius of the front spherical surface of the first lens element of the doublet, the very front of the objective, must be greater than 0.23 times the focal length of the objective. Also, this radius must be substantially less than the absolute values of the other spherical surfaces in the doublet. The radius of the cemented surfaces of the doublet are about 0.4 times the objective focal length, while the radius of the rear surface of the second lens element is about 0.7 times the objective focal length.

The axial distance between the front surface of the front lens group and the front surface of the rear lens group must be at least 0.37 times the focal length of the objective. This value in the hereinafter example is a little over 0.40.

The radius of the front surface of the third lens element, the front of the rear lens group, is between about 0.1 and 0.2 times the focal length of the objective. The radius of the rear surface of the third lens element is greater than two times the curvature of the front surface of that element, and less than infinity.

The fourth lens element, the rear of the rear lens group, is separated from the third lens element by a small air space which has the form of a negative lens with a positive power.

The radius of the front surface of the fourth lens element is substantially larger than the objective focal length, and in the accompanying example the value of this radius is infinity. The radius of the rear surface of the fourth lens element is substantially ¼ the objective focal length.

In cameras having a shutter immediately behind the objective and in other cameras where the front casing wall of the camera introduces a light limiting factor, there is the aforesaid possibility of vignetting. In order to avoid vignetting in this circumstance, the positive (first) lens element of the doublet has an axial thickness greater than 0.08 times the focal length of the objective. This permits an increase in the diameter of the doublet. The top limit for the axial thickness of this first lens element will be determined by practical considerations of excess glass; it usually is about 0.16 times the focal length.

The single figure of the drawing shows a telephoto objective embodying the present invention, and in connection with this figure there is herewith given an example of an objective embodying the present invention. It is understood that the drawing follows the usual conventions with regard to objectives, light going from left to right, with a radius (R) being positive if the center of curvature is to the right of the lens surface, and negative if the center of curvature is to the left of the lens surface. The diaphragm or shutter 5 for the objective is shown as being substantially midway between the opposed surfaces of the second and third lens elements.

In the example, the various distances are measured axially of the objective. The quantity "$nd$" refers to the index of refraction for the D line for sodium, this corresponding to a wave length of 589.3 millimicrons. The letter "$v$" refers to the Abbe number for dispersion. It will be noted that in the example given, the first and third lens elements have moderately high Abbe numbers indicating rather low dispersive powers, while the second and fourth lens elements have low numbers indicating substantial dispersive powers.

*Example*

Relative aperture 1 : 4.5, focal length 100 mm.

| | | | |
|---|---|---|---|
| $R_1 = +24.010$ | $d_1 = 10.0$ | $nd = 1.62398$ | $v = 47.0$ |
| $R_2 = -40.877$ | $d_2 = 1.2$ | $nd = 1.74066$ | $v = 27.2$ |
| $R_3 = +70.942$ | $l_1 = 29.0$ | | |
| $R_4 = -13.395$ | $d_3 = 0.8$ | $nd = 1.61008$ | $v = 46.0$ |
| $R_5 = -97.629$ | $l_2 = 0.03$ | | |
| $R_6 = \infty$ | $d_4 = 1.7$ | $nd = 1.72719$ | $v = 28.0$ |
| $R_7 = -27.623$ | | | |

From the above description it is thought that the construction and advantages of my invention will be readily apparent to those skilled in the art. Various changes in detail may be made without departing from the spirit or losing the advantages of the invention.

Having thus described by invention, what I claim as new and desire to secure by Letters Patent is:

1. A telephoto objective corrected for spherical and chromatic aberration, coma, astigmatism, field curvature and distortion, said objective comprising four lens elements divided into two groups of two elements each, the front group being positive and including a converging first element and a diverging second element cemented together, the rear group being negative and including a single negative third element and a single positive fourth element separated by a small air space having the form of a negative lens with positive power, the two groups being separated by an air space greater than 0.2 and less than 0.5 times the focal length of the objective, the radius of the front surface of said first element being greater than 0.23 times the objective focal length, the radius of the cemented surfaces of the first two elements being about 0.4 times the objective focal length, the radius of the rear surface of said second element being about 0.7 times the objective focal length, the radius of the front surface of said third element being between 0.1 and 0.2 times the objective focal length, the radius of the rear surface of said third element being greater than 0.2 times the objective focal length and less than infinity, the radius of the front surface of said fourth element being substantially larger than the objective focal length, and the radius of the rear surface of said fourth element being substantially ¼ the objective focal length, the combined axial thickness of the first two elements plus the separation between the opposed surfaces of the second and third elements being at least 0.37 times the objective focal length.

2. The combination according to claim 1 wherein the axial thickness of said first element is greater than 0.08 times the objective focal length and less than 0.16 times the objective focal length.

3. A fully corrected 100 mm. focal length telephoto objective having substantially the following characteristics:

| | | | |
|---|---|---|---|
| $R_1 = +24.010$ | $d_1 = 10.0$ | $nd = 1.62398$ | $v = 47.0$ |
| $R_2 = -40.877$ | $d_2 = 1.2$ | $nd = 1.74066$ | $v = 27.2$ |
| $R_3 = +70.942$ | $l_1 = 29.0$ | | |
| $R_4 = -13.395$ | $d_3 = 0.8$ | $nd = 1.61008$ | $v = 46.0$ |
| $R_5 = -97.629$ | $l_2 = 0.03$ | | |
| $R_6 = \infty$ | $d_4 = 1.7$ | $nd = 1.72719$ | $v = 28.0$ |
| $R_7 = -27.623$ | | | | where R is the radius of the surface indicated, going from front to rear of the objective, $d$ is axial thickness, $l$ is axial separation, $nd$ is the index of refraction and $v$ is the dispersion number.

FRANZ SCHLEGEL.

REFERENCES CITED

The following references are of record in the file of this patent:

UNITED STATES PATENTS

| Number | Name | Date |
|---|---|---|
| 1,156,743 | Booth | Oct. 12, 1915 |
| 2,239,538 | Richter | Apr. 22, 1941 |
| 2,421,927 | Cox | June 10, 1947 |

FOREIGN PATENTS

| Number | Country | Date |
|---|---|---|
| 904,254 | France | Feb. 19, 1945 |